(12) United States Patent
Krupke

(10) Patent No.: US 7,061,960 B2
(45) Date of Patent: *Jun. 13, 2006

(54) DIODE-PUMPED ALKALI AMPLIFIER

(76) Inventor: William F. Krupke, 1564 Foothill Rd., Pleasanton, CA (US) 94588

( * ) Notice: Subject to any disclaimer, the term of this patent is extended or adjusted under 35 U.S.C. 154(b) by 211 days.

This patent is subject to a terminal disclaimer.

(21) Appl. No.: 10/658,857

(22) Filed: Sep. 9, 2003

(65) Prior Publication Data

US 2004/0218255 A1 Nov. 4, 2004

Related U.S. Application Data

(63) Continuation-in-part of application No. 10/000,508, filed on Oct. 23, 2001, now Pat. No. 6,643,311.

(51) Int. Cl.
*H01S 3/22* (2006.01)
*H01S 3/223* (2006.01)

(52) U.S. Cl. .......................... 372/56; 372/55

(58) Field of Classification Search .......... 372/55, 372/56, 70, 75

See application file for complete search history.

(56) References Cited

U.S. PATENT DOCUMENTS

| | | | | |
|---|---|---|---|---|
| 3,816,754 | A * | 6/1974 | Hodgson et al. | 359/327 |
| 4,151,486 | A * | 4/1979 | Itzkan et al. | 372/3 |
| 4,807,240 | A * | 2/1989 | Goldstone | 372/69 |
| 5,283,800 | A * | 2/1994 | Suzuki et al. | 372/60 |
| 5,289,481 | A | 2/1994 | Xie et al. | |
| 6,160,934 | A | 12/2000 | Beach et al. | |
| 6,331,993 | B1 * | 12/2001 | Brown | 372/55 |

OTHER PUBLICATIONS

Z. Konefal and M. Ignaciuk; Stimulated Collision Induced Processes in Sodium Vapor in the Presence of Helium; May 11, 1990; Applied Physics B, Photo-Physics and Laser Chemistry.*

Z. Konefal and M. Ignaciuk; Stimulated Collision Induced Processes In Sodium Vapor In The Presence Of Helium; May 11, 1990; Applied Physics B, Photo-Physics And Laser Chemistry.*

Stephen Anderson, "Review and Forecast of the Laser Markets; Part 1: Nondiode Lasers", Laser Focus World, PennWell Publishers, Jan., 2001.

Peter Loosen, "Lasers in Materials Processing", Advances in Lasers and Applications, pp287-317, Proc. $52^{nd}$ Scottish Univ. Summer School in Physics, St. Andrews, Sept. 1998.

(Continued)

*Primary Examiner*—Wilson Lee
*Assistant Examiner*—Leith Al-Nazer
(74) *Attorney, Agent, or Firm*—John P. Wooldridge

(57) ABSTRACT

Compact, high-power, near-diffraction-limited sources of radiation in the near infrared spectral region are provided by a new class of power amplifiers that can be pumped by conventional high-power, multimode, relatively-broadband 1-D and 2-D laser diode arrays, where the pumped amplifier gain medium is an atomic vapor of one of the alkali elements (Li, Na, K, Rb, Cs), buffered with a mixture of rare-gas (He, Ar, Kr, Ne, or Xe) and selected molecular gases. Given the central role of the alkali atomic vapor as the entity providing amplifier gain, this new type of amplifier is herein designated as the diode-pumped alkali amplifier (DPAA).

18 Claims, 5 Drawing Sheets

OTHER PUBLICATIONS

W. Schulz and R. Poprawe, "Manufacturing with Novel High-Power Diode Lasers", IEEE J. Selected Topics in Quantum Electronics, 6, 696 (2000).

M. S. Albert and D. Balamore, "Development of Hyperpolarized Noble Gas MRI", Nuclear Instruments and Methods in Physics Research, A402, 441 (1998).

I. A. Nelson, B. Chann, and T. G. Walker, "Spin-exchanged Optical Pumping Using a Frequency-Narrowed, High-Power Diode Laser", Appl. Phys. Lett., 76, 1356 (2000).

H. Treusch, et. al., "compact High Brightness and High Power Diode Laser Source for Materials Processing", SPIE, 3945, 23 (2000).

G. Schmidt, et. al/. "New Diode Pumped Multi kW Solid State Laser-Modeling of the Performance in Comparison with Experimental Results", SPIE, vol. 3613, pp8-15, (1999).

P. S. Doidge, "A Compendium and Critical Review of Neutral Atom Resonance Line Oscillator Strengths for Atomic Absorption Analysis", Spectrochmica Acta., 50B, 209 (1995).

S. Ch'en and M Takeo, "Broadening and Shift of Spectral Lines Due to the Presence of Foreign Gases", Rev. Mod. Phys., 29, 20 (1957).

W. R. Hindmarsh and J. M. Farr, "Collision Broadening of Spectral Lines by Neutral Atoms", Prog. In Quantum Electronics, 2, 141 (1972).

R. O. Garrett and S. Y. Ch'en, "Pressure Effects of Foreign Gases on the Absorption Lines of Cesium. II. The Effects of Helium on the First Two Members of the Principal Series", Phys. Rev., 144, 66 (1966).

M. D. Rotondaro and G. P. Perram, "Collisional Broadening and Shift of the Rubium $D_1$ and $D_2$ Lines by Rare Gases, $H_2$, $D_2$, $N_2$, $CH_4$, and $CF_4$", J. Quant. Radiat. Transfer, 57, 497 (197).

L. Krause, "Collisional Excitation Transfer Between the $^2P_{1/2}$ and $^2P_{3/2}$ Levels in Alkali Atoms", Applied Optics, 5, 1375 (1996).

E. S. Hrycyshyn and L. Krause, "Inelastic Collisions Between Excited Alkali Atoms and Molecules, VII. Sensitized Fluorescence and Quenching in Mixtures of Rubidium with $H_2$, HD, $D_2$, $N_2$, $CH_4$, $CD_4$, $C_2H_4$, and $C_2H_6$.", Can. J. Phys., 48, 2761 (1970).

E. Walentynowicz, et al., "Inelastic Collisions Between Excited Alkali Atoms and Molecules X. Temperature Dependence of Cross Sections for $^2P_{1/2}$ -$^2P_{3/2}$ Mixing in Cesium, Induced in Collisions with Deuterated Hydrogens, Ethanes, and Propanes", Can. J. Phys., 52, 589 (1974).

Z. Konefal, "Observation of Collision Induced Processes in Rubium-Ethane Vapour", Optics Communications, 164, 95 (1999).

E. Spellier et al, "Quenching Cross Sections for Alkali-Inert Gas Collisions", Z. Phys., A291, 311 (1979).

B. A. Glushko et al. "Processess of Stimulated Electronic Raman Scattering and Stimulated Resonance Emission in Potassium Vapor in the Presence of a Buffer Gas". Opt. Spectrosc (USSR), 52, 458 (1982).

A. A. Dabagyan et al., "Stimulated Processes in Potassium Vapor in the Presence of a Buffer Gas", Sov. Phys., JETP, 58, 700 (1983).

A. A. Dabagyan et al., "Development over time in the Induced Resonant Processes in Potassium Vapor, in the Presence of Collisions", Izvestiya Alademii Nauk, SSR, Seriya Fizicheskaya, 47, 1609 (1983).

S. N. Atutov, A.I. Plekhanov, and A. M. Shalagin, "Superluminosity on the Resonant Transition of Na Atoms under Optical Excitation", Opt. Spectrosc (USSR), 56, 134 (1984).

M. E. Movsesyan, T. O. Ovakimyan, and S. V. Shmavonyan, "Stimulated Processes in a Mixture of Rubidium Vapor and Buffer Gas Under Two Photon Excitation", Opt. Scpetrosc (USSR), 61, 285 (1986).

J. Czub, J. Fiutak, and W. Milklaszewski, "On Collision-Induced Amplified Emission of Alkali Atoms", Z. Phys., D3, 23 (1986).

A. M. Davtyan, M. E. Movsesyan, A. V. Papoyan, and S. V. Shmavonyan, "Laser Resonance Radiation at the Atomic-Potassium D1 Line", Opt. Spectrosc (USSR), 66, 686 (1989).

Z. Konefal and M. Ignaciuk, "Stimulated Collision Induced Processes in Sodium Vapor in the Presence of Helium", Appl. Phys., B51, 285 (1990).

Z. Konefal and M. Ignaciuk, "Observation of Collision-Induced Amplified Emission in Na-Noble-Gas System", Z. Phys., D27, 49 (1993).

Z. Konefal and M. Ignaciuk, "Investigation of Collisionally Induced Stimulated Scattering in Sodium Vapor with Temporal and Spectral Resolution", Appl. Phys., B61, 101 (1995).

J. Czub, J. Fiutak, and W. Miklaszewski, "Influence of Resonant Pulse Propagation on Collision-Induced Stimulated Effects in the $^2S_{1/2}$ -$^2 P_{1/2/3/2}$ System", Phys. Rev., A54, 746 (1996).

Z. Konefal and M. Ignaciuk, "Stimulated Processes in Sodium Vapor in the Presence of Molecular Buffer Gas Systems", Opt. And Quantum Electronics, 28, 169 (1996).

R. J. Beach, "CW Theory of Quasi-Three-Level End-Pumped Laser Oscillators", Opt. Commun., 123, 385 (1995).

* cited by examiner

DIODE-PUMPED ALKALI AMPLIFIER

This is a continuation-in-part of U.S. patent application Ser. No. 10/000,508, titled "Diode-Pumped Alkali Laser" filed Oct. 23, 2001 now U.S. Pat. No. 6,643,311 and incorporated herein by reference.

BACKGROUND OF THE INVENTION

1. Field of the Invention

The present invention relates to laser amplifiers, and more specifically to diode-pumped alkali amplifiers (DPAAs).

2. Description of Related Art

U.S. patent application Ser. No. 10/000,508 describes a new class of diode-pumped alkali lasers (DPALs). The DPAL device comprises 1) a laser gain medium formed of an atomic alkali vapor, appropriate rare gas buffer gas or gasses, and a selected small molecular weight gas; 2) an optically assessable container (cell, capillary, vessel, etc.) containing the laser gain medium; 3) a laser resonator cavity, containing the laser gain medium, one of which including cavity mirrors that allow for the irradiation of the alkali vapor gain medium; and 4) a semiconductor laser diode (or diode array) whose output radiation is used to optically excite alkali atoms of the laser gain medium in the $^2S_{1/2}$-$^2P_{3/2}$ resonance transition (so-called $D_2$ line). The semiconductor laser pump irradiation induces a population inversion between the $^2P_{1/2}$ and ground $^2S_{1/2}$ levels and laser oscillation on the $^2P_{1/2}$-$^2S_{1/2}$ transition (so-called $D_1$ line).

From the teachings of the parent application, the efficient conversion of pump radiation can be realized, even utilizing a semiconductor laser diode pump whose spectral width is many times the spectral width of the homogeneously-broadened $D_2$ line as a result of proper laser design, taking into account substantial power absorption and transfer through the Lorentizian wings of the $D_2$ line. The principal DPAL performance characteristics, projected using a DPAL design, calculations have been confirmed experimentally. This success achieved with alkali laser oscillators prompted an examination of the feasibility and practicality of diode-pumped alkali amplifiers, DPAAs.

SUMMARY OF THE INVENTION

It is an object of the present invention to provide efficient, compact, high-power, near-diffraction-limited sources of radiation in the near infrared spectral region.

It is another object of the invention to provide a new class of power amplifiers that can be pumped by conventional high-power, multimode, relatively-broadband 1-D and 2-D laser diode arrays, wherein the pumped amplifier gain medium comprises an atomic vapor of one of the alkali elements (Li, Na, K, Rb, Cs), buffered with a mixture of rare-gas (He, Ar, Kr, Ne, or Xe) and selected molecular gases.

These and other objects will be apparent to those skilled in the art based on the disclosure herein.

The use of an alkali atomic vapor element as laser active specie in a near infrared Diode-Pumped Alkali Laser (DPAL) has been disclosed in U.S. patent application Ser. No. 10/000,508, titled "Diode-Pumped Alkali Laser" filed Oct. 23, 2001, and incorporated herein by reference. In the basic DPAL device, excitation to the n $^2P_{3/2}$ electronic level by a single diode laser pump source leads to a population inversion between the first excited electronic $^2P_{1/2}$ level and the ground $^2S_{1/2}$ level, permitting the construction of efficient, high-power, compact DPAL laser oscillators in the near infrared spectral region.

The present invention provides efficient, compact, high-power, near-diffraction-limited sources of radiation in the near infrared spectral region. The invention provides a new class of power amplifiers that can be pumped by conventional high-power, multimode, relatively-broadband 1-D and 2-D laser diode arrays, wherein the pumped amplifier gain medium comprises an atomic vapor of one of the alkali elements (Li, Na, K, Rb, Cs), buffered with a mixture of rare-gas (He, Ar, Kr, Ne, or Xe) and selected molecular gases. Given the central role of the alkali atomic vapor as the entity providing amplifier gain, this new type of amplifier is herein designated as the diode-pumped alkali amplifier (DPAA).

The three lowest lying electronic levels of the alkali atom are utilized in the present DPAA designs. In the DPAA, the alkali atom is pumped at a wavelength matching the wavelength of the $^2S_{1/2}$-$^2P_{3/2}$ electric-dipole-allowed transition (the so-called $D_2$ transition). After kinetic relaxation of pump excitation energy to the $^2P_{1/2}$ electronic level, a population inversion density is created between the excited $^2P_{1/2}$ and the $^2S_{1/2}$ ground level, producing optical gain in the electric-dipole-allowed $^2P_{1/2}$-$^2S_{1/2}$ transition (so-called $D_1$ transition).

In DPAA operation, pump radiation centered at the pump wavelength $\lambda(D_2)$ matching the $D_2$ transition is directed into an amplifier gain cell containing alkali atoms and buffer gases. The alkali atoms in the amplifier gain cell are selectively pumped into the $^2P_{3/2}$ electronic level via the $D_2$ transition, whereupon these atoms collisionally relax to the lower lying $^2P_{1/2}$ electronic level before they can radiatively decay back to the $^2S_{1/2}$ ground level, due to the presence of the buffer gas(es). The buffer gas(es) also serve to collisionally broaden the alkali atom D-transitions, rendering them homogeneously broadened.

The $D_2$ transition wavelengths for Cs, Rb, and K lie in the spectral region ~760–850 nm for which powerful and efficient laser diode arrays are commercially available. Therefore, these particular alkali atoms are utilized in preferred DPAA embodiments.

A basic DPAA device configuration takes the form of an "end-pumped" configuration, accommodating the fact that the DPAA produces optical gain using a "three-level" population inversion scheme. In this basic configuration, the alkali-buffer gas amplifier gain medium is contained within a cell, which is fitted with flat optical windows at each end. These window surfaces may be coated with multilayer dielectric stacks to reduce reflection losses of pump and amplified radiation from these surfaces upon entering and/or exiting the amplifier gain cell. To energize the DPAA, pump radiation provided by a laser diode pump array having a wavelength centered at the wavelength $\lambda(D_2)$ matching the $D_2$ transition is directed into the amplifier gain cell generally parallel along the cell axis, through a first gain cell window. Pump radiation propagates through the gain cell, progressively being absorbed by alkali atoms. The pump radiation may freely propagate in the cell volume and reflect periodically from the wall of the gain cell, depending on the DPAA design. Pump radiation may be substantially absorbed in a single pass of the gain cell, or after a second pass through the gain cell, effected by placing a suitable mirror at the end of the gain cell. The absorbed pump radiation produces optical gain at a wavelength $\lambda(D_1)$ centered at the wavelength of the $D_1$ transition.

To obtain amplification and extract power from the DPAA, a low power, near diffraction-limited source of radiation (often called a master oscillator, or MO) with a wavelength $\lambda(D_1)$ centered at the wavelength of the $D_1$ transition of the alkali vapor contained in the amplifier gain cell, is directed into the amplifier gain cell, generally along the axis of the gain cell, and spatially overlapping a substantial fraction of the volume of the alkali-buffer-gas medium excited by the pump radiation. As the low power MO passes through the amplifier cell it initially grows exponentially in intensity until it becomes sufficiently intense to saturate the gain of the alkali gain medium and extract a substantial portion of the pump excitation deposited in the amplifier.

In one embodiment, the pump and MO beams are spatially overlapped and generally co-aligned in direction of propagation, and directed into the amplifier gain cell. In this basic configuration, the MO beam passes once through the gain cell and exits from the opposite end. In an alternative preferred embodiment, and taking advantage of the fact that the optical gain in the alkali-buffer-gas medium is polarization insensitive (even if excited by a polarized pump beam), polarized MO and pump beams are utilized and an optical arrangement is employed that allows the amplifier MO beam to pass twice through the amplifier gain cell so as to increase the efficiency of extraction of power from the DPAA.

In another embodiment that avoids the need to utilize dichroic optical elements, the radiation from a laser diode pump array is coupled into the amplifier gain cell using a hollow lens-duct. A polarized MO beam is coupled into the gain cell along the co-aligned axes of the hollow lens-duct and the amplifier gain cell; this input MO beam is doubled passed through the amplifier gain cell, and extracted from the DPAA using a Faraday rotator and output polarizer plate.

Many other DPAA embodiments will be obvious to those skilled in the art based of the teaching herein. Unexpectedly high power conversion efficiency of relatively broadband diode pump array radiation into amplified beam power can be realized in a DPAA because it proves possible to effectively deposit much of the pump power into the alkali atoms through the homogeneously-broadened Lorentzian wings of the pump transition.

DETAILED DESCRIPTION OF THE INVENTION

Using the same steady-state, plane-wave, rate-equation approach adopted to assess DPALs in the parent case, it was possible to calculate amplifier performance of DPAAs. Systematic calculations of the performance of DPAA devices were carried out in terms of the key pump drive and device parameters (alkali number density, buffer gas mixtures and pressures, pump spectral intensity, device geometry, etc.). From these calculations, it became clear that practical DPAA designs could be realized, as a result of efficient "wing-pumping" of the homogeneously-broadened $D_2$ line, enabling efficient narrowband power extraction from the alkali amplifier in the spectrally-homogeneously broadened $D_1$ line. As is well known, the availability of an efficient power amplifier at a given wavelength permits the realization of a master-oscillator, power-amplifier (MOPA) laser system configuration. Compared with the conventional laser oscillator (using the same gain medium), the MOPA has the distinct advantageous property of achieving a near-diffraction-limited, high power output beam from the MOPA by using a low-power master-oscillator input beam having near-diffraction-limited beam quality, which is relatively easy to provide. Additionally, since there are no wavelength selective elements in the DPAA MOPA, other than the homogeneously-broadened $D_1$ gain transition, spectrally narrowband power can be extracted from the DPAA when a spectrally narrowband MO is employed in the MOPA. For these advantages to be practical, it is desirable that power amplifier gains >20–50 (per stage) be achievable and that pump power delivered into the amplifier can be extracted with high efficiency. DPAAs, as a class, possess these characteristics.

Figure 1:
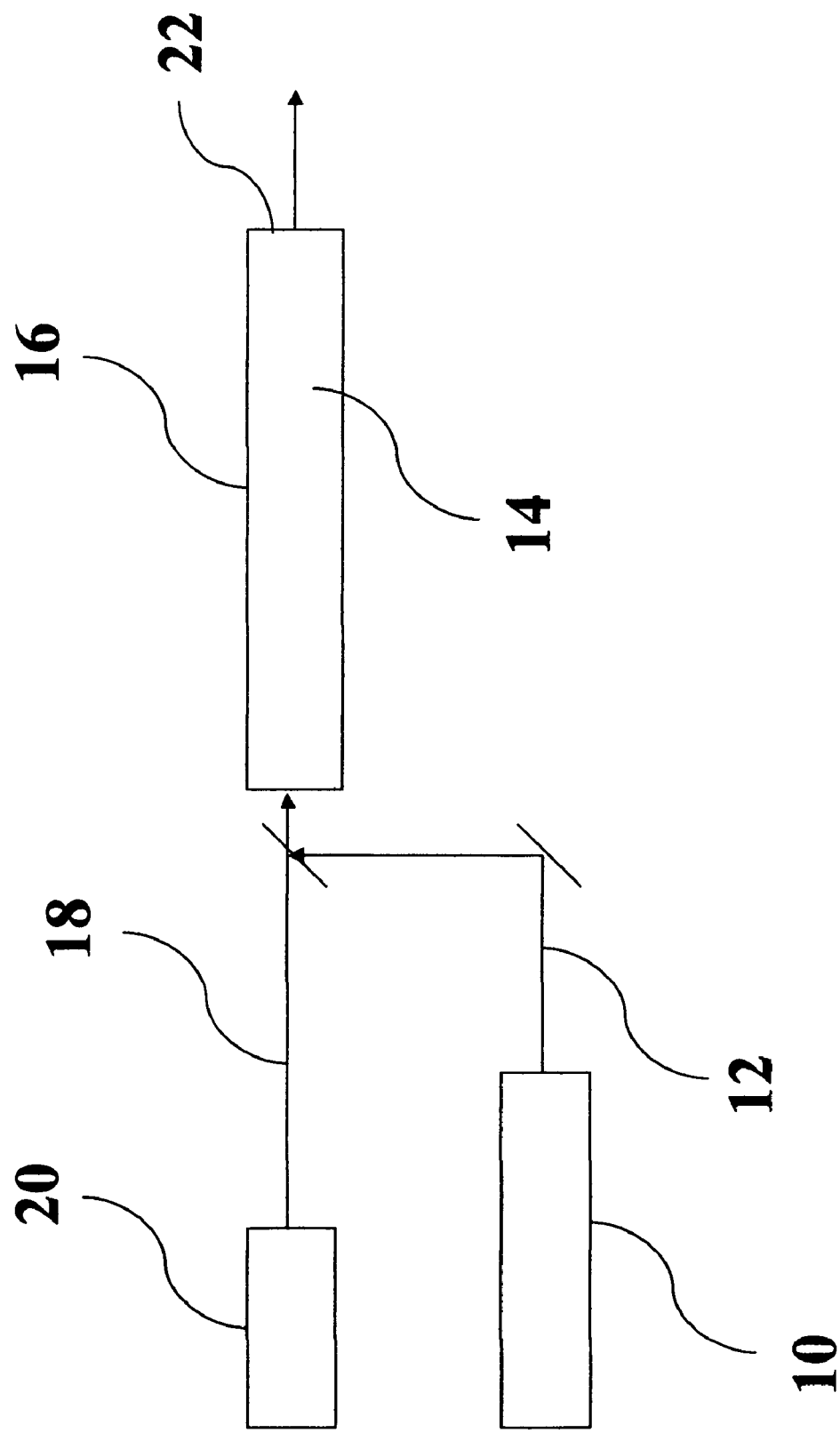
FIG. 1 is a schematic layout of a master-oscillator, power amplifier (MOPA) implemented with a diode-pumped alkali amplifier (DPAA).

To illustrate this assertion, the results of DPAA performance calculations are presented here for the specific case of a rubidium alkali amplifier. FIG. 1 shows a schematic of a master-oscillator, power amplifier (MOPA) implemented with a diode-pumped alkali amplifier (DPAA). This basic DPAA architecture comprises a diode pump source 10 (either single broad stripe, multi-stripe bar, or 2-D multi-stripe bar array) emitting a beam 12 at a wavelength $\lambda(D_2)$ matched to the wavelength of the corresponding $D_2$ transition of the alkali vapor gain medium 14 contained within the alkali amplifier cell 16. The amplifier gain medium comprises the working alkali vapor and one or more buffer gases whose combined purposes are to sufficiently broaden the $D_2$ and $D_1$ alkali atom transitions, and to thermalize the populations between the two excited $^2P$ levels in a time shorter than the radiative lifetimes of the $^2P$ levels. The pump beam is directed into the alkali power amplifier cell generally along the cell axis (and may be double-passed through the amplifier cell by reflecting the pump beam back through the amplifier cell from a mirror (e.g., mirror 22) placed at the end of the amplifier cell, a mirror that is preferentially reflective at the wavelength of the pump beam). A relatively weak (compared to the pump beam intensity) input beam of radiation 18 (from the master oscillator 20) at wavelength $\lambda(D_1)$ matching the wavelength of the $D_1$ transition of the alkali gain medium is also directed into the alkali power amplifier gain cell, generally along the cell axis, co-parallel to the pump beam. The intensity of this input beam at wavelength $\lambda(D_1)$ is amplified when passing through the pump excited alkali gain medium, as a result of the population inversion created between the $^2P_{1/2}$ level and the ground $^2S_0$ level produced by absorption of pump radiation at wavelength $\lambda(D_2)$.

As in the DPALs oscillator implementation, the half-power spectral width of the pump diode can be many times the half-width of the (Lorentizian) collisionally-broadened width of the alkali vapor medium, since it is feasible to efficiently absorb pump radiation by the alkali atoms in the far spectral wings of the $D_2$ pump transition. Although the present invention is operable using pump diodes that have narrow spectral widths, e.g., much less than 1 nm, the advantage provided by the present invention lies in the fact that it is operable using commercially available laser diode, which currently generally have spectral widths within a range from about 1 nm to 6 nm. Since the alkali vapor medium is homogeneously broadened by collisions with the buffer gas(es), absorbed pump energy is available to be transferred efficiently to the relatively weak input beam. The relatively weak input beam can be extracted from the amplifier after passing once through the power amplifier cell, or it too may be double-passed through the power amplifier gain cell, further increasing the power in its beam. Using appropriate optical elements, the pump and input beams can be combined at the entrance to the amplifier gain cell, and also separated from each other after double passing through the gain cell. There are several obvious combinations of input and reflector optical elements that can be employed to perform the pump and input beam combining before the gain cell, and beam separation after amplification (either single pass or double pass). Two such embodiments are shown in FIGS. 2 and 3.

Figure 2:
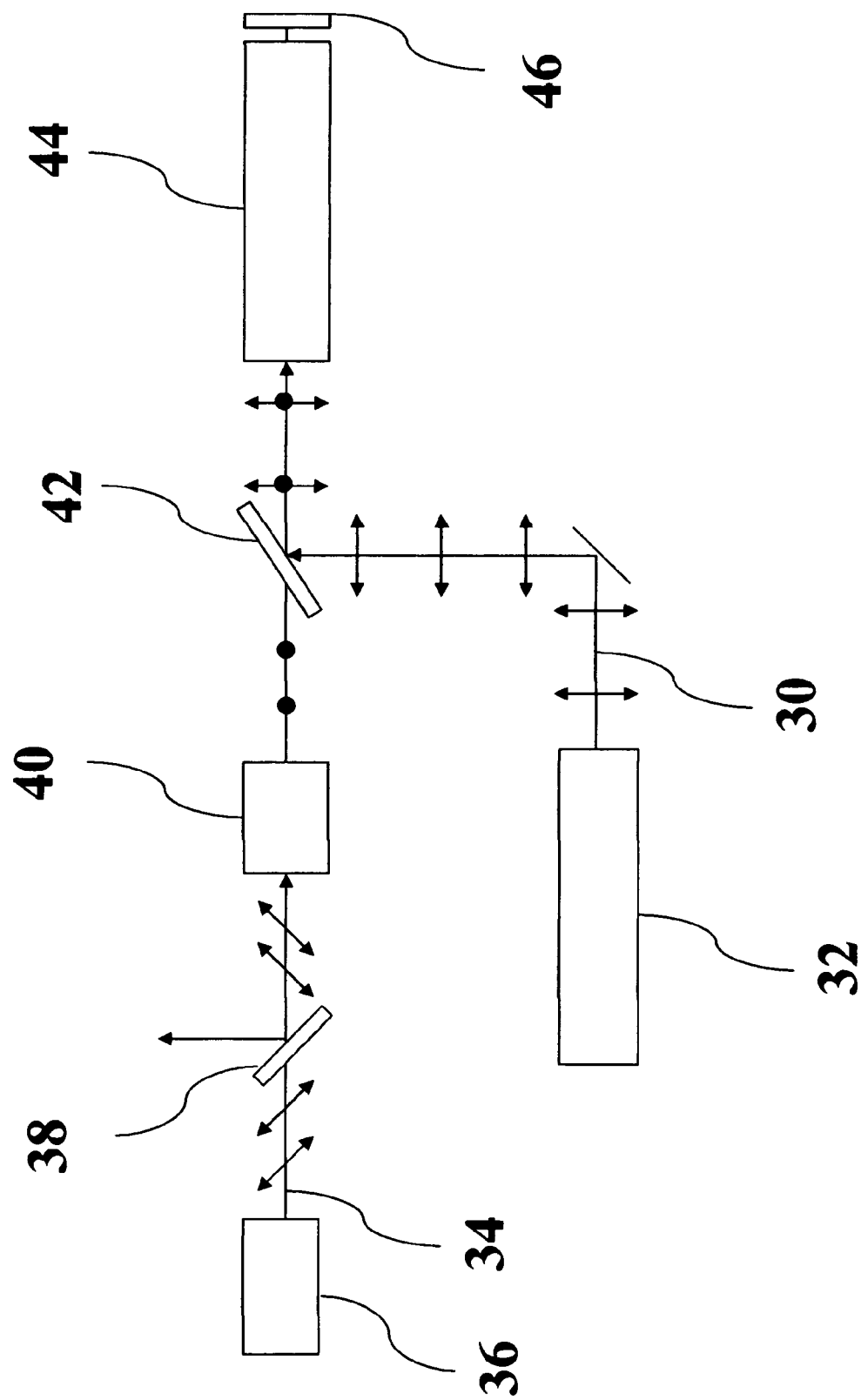
FIG. 2 shows a first embodiment of a double-passed, diode-pumped alkali power amplifier in a master-oscillator, power amplifier (MOPA) laser system.

FIG. 2 shows an embodiment of a double-passed, diode-pumped alkali power amplifier in a master-oscillator, power amplifier (MOPA) laser system. The master oscillator (MO) may be a diode-pumped alkali laser (DPAL) or may be any other low-power master oscillator laser emitting at wavelength $\lambda(D_1)$. The pump beam 30 (from diode pump laser 32) at wavelength $\lambda(D_2)$ and the low power input beam 34 (from the master oscillator 36) at wavelength $\lambda(D_1)$ are both linearly polarized. The MO input beam is passed through an input-output polarizing beam splitter 38 and a Faraday Rotator (FR) cell 40. The FR cell rotates the input beam polarization by 45 degrees rendering the polarization perpendicular to the plane of the page, as indicated by dots along the beam path). This MO beam next passes through a dichroic thin-film polarizer 42 that is oriented to provide high transmission at wavelength $\lambda(D_1)$. The pump beam is directed toward the dichroic thin-film polarizer and its plane of polarization is oriented (here parallel to the plane of the page) is such a way that it is highly reflected at wavelength $\lambda(D_2)$. With this arrangement, the MO and pump beams are spatially overlapped at the thin film polarizer and generally co-directed toward and into the alkali power amplifier 44. The pump and MO beams are each propagated through the alkali gain cell and are redirected for a second pass through the cell by a mirror 46, placed at the end of the cell. The mirror is coated so as to provide high reflectivities at wavelengths $\lambda(D_1)$ and $\lambda(D_2)$. Generally, the multimode pump beam will be substantially more divergent than the MO beam, and the pump radiation may be propagated generally through the cell by reflecting periodically from the cell wall surfaces. Generally, the beam quality of the MO will be near-diffraction-limited and will be propagated through the cell without reflection from the cell wall surfaces. During its double pass through the power amplifier cell containing a mixture of alkali vapor and buffer gases, the pump beam is highly absorbed at the wavelength $\lambda(D_2)$ of the $^2S_{1/2}$-$^2P_{3/2}$ transition (so-called $D_2$ transition) of the subject alkali vapor. This pump excitation process leads to a population inversion and gain on the $^2P_{1/2}$-$^2S_{1/2}$ transition (so-called $D_1$ transition) at the wavelength $\lambda(D_1)$. The relatively weak input beam from the master oscillator is greatly amplified in power upon passing through the gain cell. The amplified MO beam retains its polarization and exits the amplifier cell, passing through the dichroic thin-film polarizer and the Faraday Rotator cell a second time, undergoing an additional 45-degree rotation. The polarization of the amplified beam at wavelength $\lambda(D_1)$ is now oriented to reflect with high efficiency from the input/output polarizing beam splitter.

Figure 3:
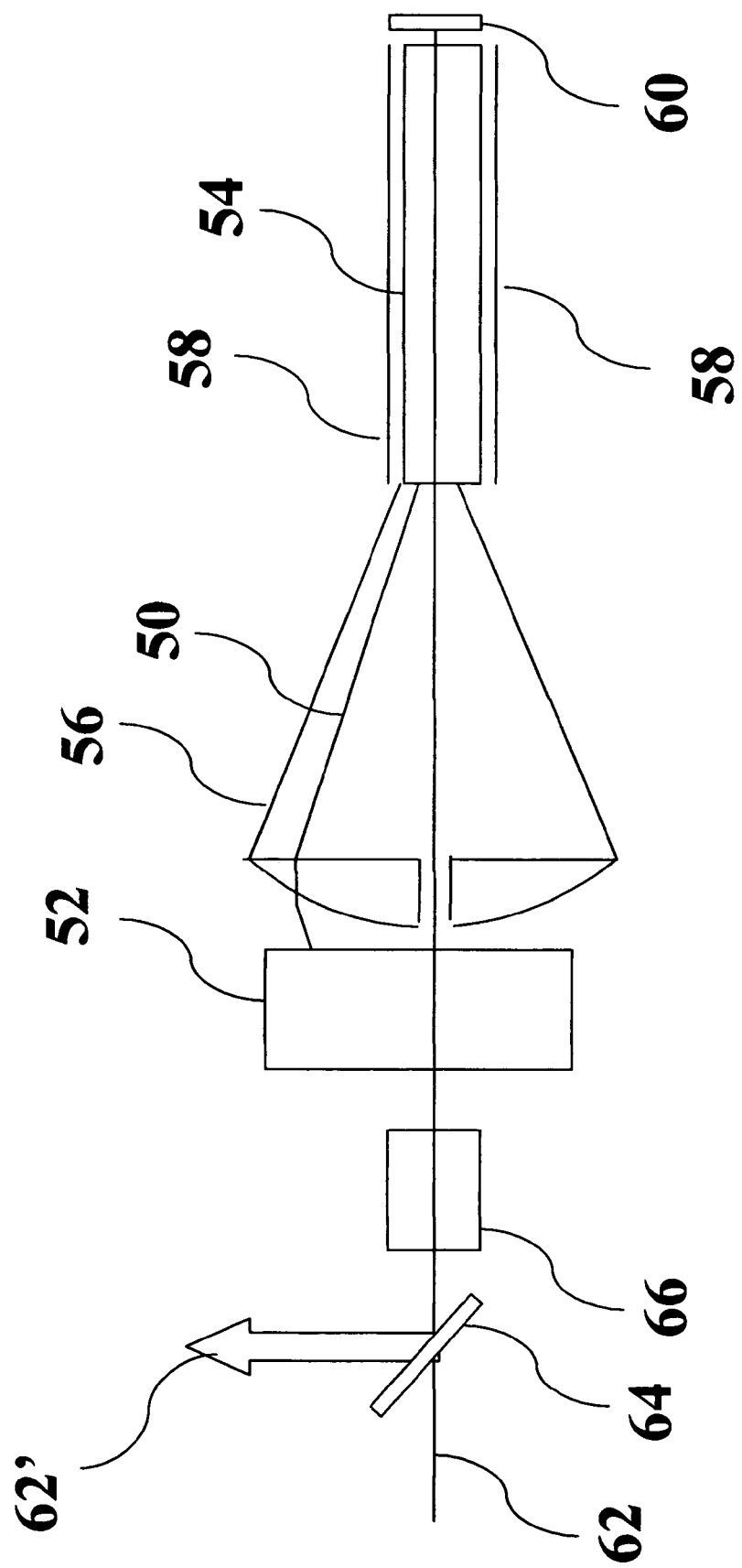
FIG. 3 shows a second embodiment of a double-passed, diode-pumped alkali power amplifier in a master-oscillator, power amplifier (MOPA) laser system.

FIG. 3 shows another embodiment of a double-passed, diode-pumped alkali power amplifier in a master-oscillator, power amplifier (MOPA) laser system. The master oscillator (MO) may be a diode-pumped alkali laser (DPAL) or may be any other low-power master oscillator laser emitting at wavelength $\lambda(D_1)$. This embodiment has the advantage of dispensing with the dichroic thin-film polarizer component needed in the implementation of the embodiment shown in FIG. 2 and described above. The radiation 50 at wavelength $\lambda(D_2)$ from a diode pump array 52 is radiance conditioned and is directed into the alkali power amplifier gain cell 54 through a hollow lens duct concentrator 56. The pump radiation propagates down the length of the gain cell, reflecting off of the cell sidewalls 58 that are coated to highly reflect radiation at the pump wavelength. A mirror 60 is placed at the far end of the amplifier gain cell to reflect pump radiation that has not yet been absorbed by the alkali vapor back through the cell for a second pass. In this embodiment, the relatively weak master oscillator input beam 62 at wavelength $\lambda(D_1)$ that is to be amplified is linearly polarized and directed through a plate polarizer 64 so as to transmit the input beam and send it toward the alkali gain cell, first passing through a Faraday Rotator cell 66 (which rotates the polarization of the input beam by 45 degrees) and then passing through a hole in the radiance conditioned pump array. The input beam is strongly amplified in power upon double passing through the alkali power amplifier, preserving its high spatial beam quality and narrow spectral width, due to the gain produced at wavelength $\lambda(D_1)$ when the pump radiation at wavelength $\lambda(D_2)$ is absorbed by the subject alkali vapor in the gain cell. After its second pass through the gain cell, the strongly amplified beam at wavelength $\lambda(D_1)$ is directed through the Faraday Rotator cell a second time, whereupon its polarization is rotated a further 45 degrees. Upon exiting the Faraday Rotator cell, the beam's polarization is now oriented so that it will be highly reflected from the plate polarizer. In this manner the amplified beam 62' at wavelength $\lambda(D_1)$ is extracted from the MOPA system.

FIG. 4–7 show the calculated performance of a doubled-passed (pump and input beams) rubidium DPAA under adoption of the parameter assumptions listed in Table 1. Each of these figures plots a performance parameter versus the quantity $(n_o l_s)$ that appears integrally in the rate equations describing both DPALS and DPAAS. Here, $n_o$ denotes the total alkali atom number density in the gain medium, and $l_s$ denotes the length of the alkali gain column (here also assumed to be the length of the amplifier gain cell).

TABLE 1

| Assumed Parameters of a Rubidium Diode-Pumped Alkali Amplifier (DPAA). | |
|---|---|
| Parameter | Value |
| pump flux | 20 kW/cm$^2$ |
| pump spectral width (FWHM) | 2 nm |

TABLE 1-continued

Assumed Parameters of a Rubidium Diode-Pumped Alkali Amplifier (DPAA).

| Parameter | Value |
|---|---|
| Input flux | 20 W/cm$^2$ |
| helium pressure | 10 atm |

Figure 4:
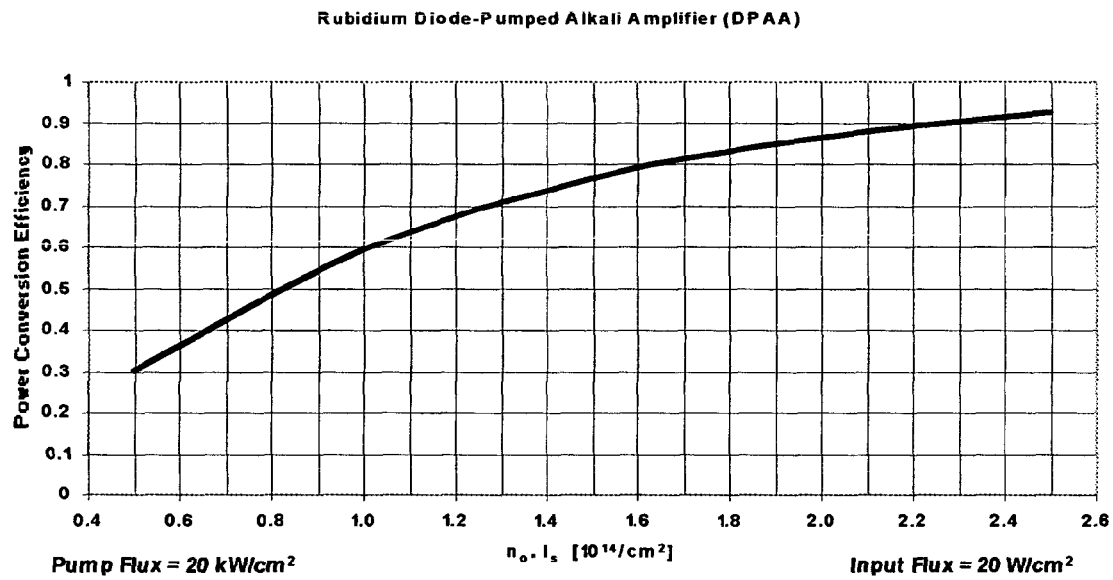
FIG. 4 shows the optical-to-optical power conversion efficiency of a rubidium amplifier as a function of $n_o*l_s$ (assuming a 20 kW/cm² pump flux and a 20 W/cm² input flux).
Figure 5:
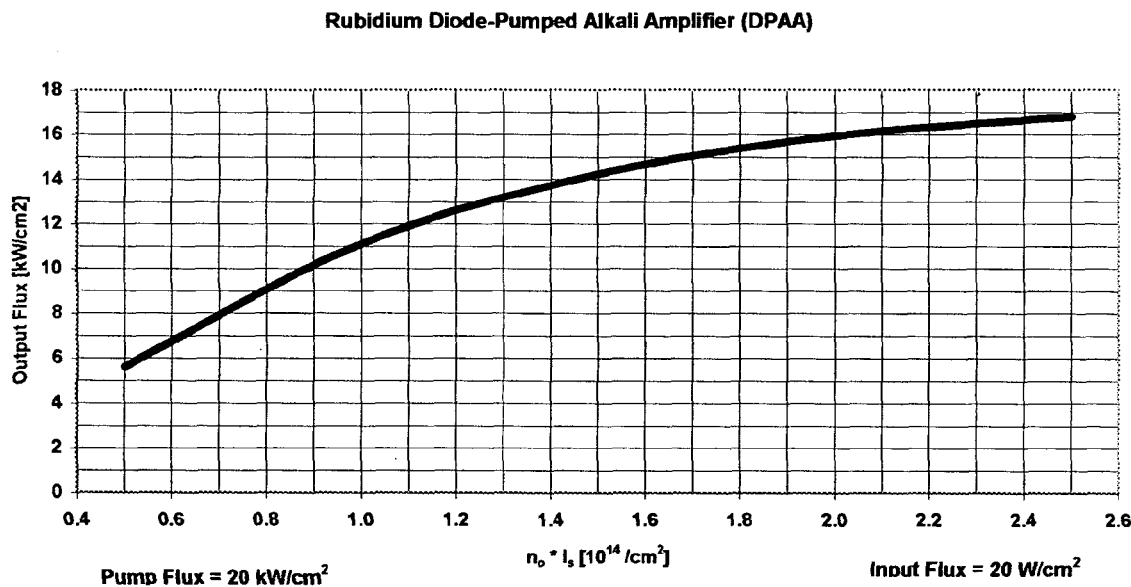
FIG. 5 shows the output power flux of a rubidium amplifier as a function of $n_o*l_s$ (assuming a 20 kW/cm² pump flux and a 20 W/cm² input flux).
Figure 6:
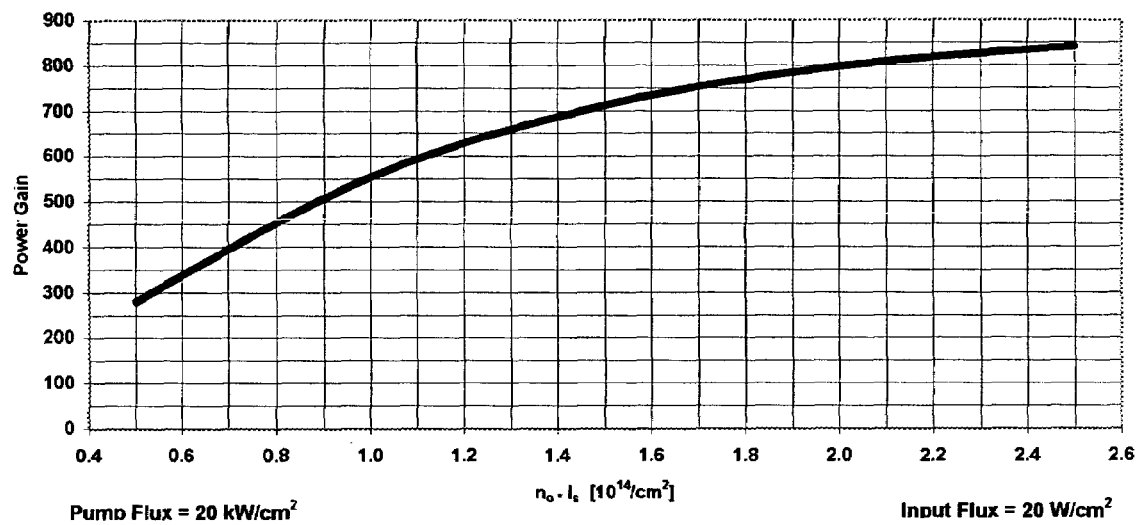
FIG. 6 shows the power gain of a rubidium amplifier as a function of $n_o*l_s$ (assuming a 20 kW/cm² pump flux and a 20 W/cm² input flux).
Figure 7:
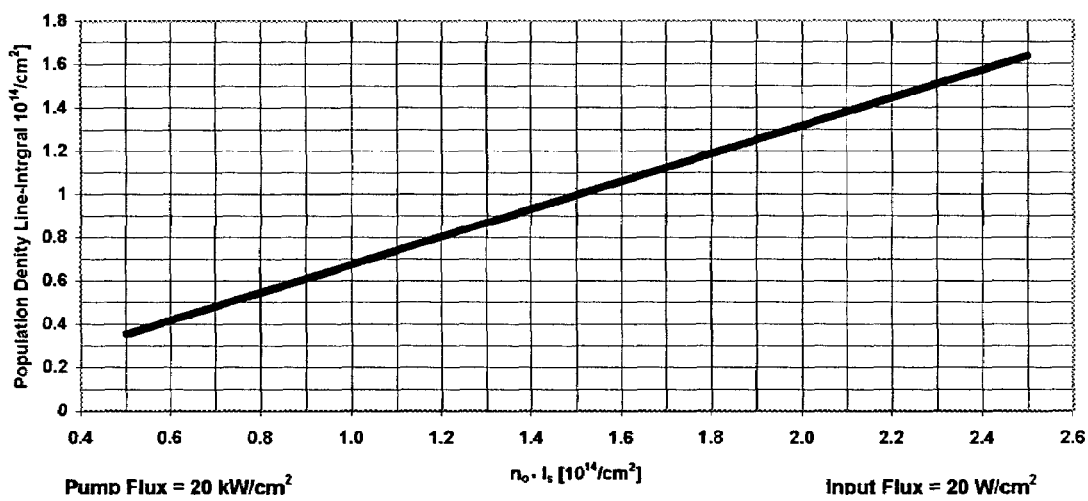
FIG. 7 shows the population density line integral of a rubidium amplifier as a function of $n_o*l_s$ (assuming a 20 kW/cm² pump flux and a 20 W/cm² input flux).

In FIGS. 4–6 the optical-to-optical power conversion efficiency, output power flux, and power gain all evidence a similar behavior as a function of the quantity, $(n_o l_s)$. FIG. 7 shows that the population density line integral, N2 is precisely linearly proportional to the value of $(n_o l_s)$. If a Rubidium amplifier that is 90% optically efficient is desired, for the assumed pump flux of 20 kW/cm$^2$ and an input flux of 20 W/cm$^2$, then, from FIG. 4, $(n_o l_s)$ must have the value $2.25 \times 10^{14}$ atom/cm$^2$. If we assume that the rubidium alkali number density is $2.25 \times 10^{13}$ atoms/cm$^3$, then the gain (amplifier cell) length, $l_s$ must be 10 cm. These device parameter values are quite reasonable, and it is anticipated that practical (efficient and compact) rubidium diode-pumped amplifiers can be realized. It is anticipated that similar amplifier performance levels can be achieved using the other alkali atoms.

The foregoing description of the invention has been presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the particular use contemplated. The scope of the invention is to be defined by the following claims.

I claim:

1. An alkali vapor optical amplifier, comprising:
a gain medium comprising a mixture of at least one buffer gas and an alkali atomic vapor having a $D_1$ transition, wherein said at least one buffer gas has the dual purpose of collisionally broadening a $D_2$ transition of said alkali atomic vapor and collisionally transferring pump excitation from the upper level of said $D_2$ transition to the upper level of said $D_1$ transition at a rate larger than the radiative decay rate of either of these two levels; and
a pump laser emitting pump radiation at a wavelength $\lambda(D_2)$ with an emission spectral width within the range from 1–6 nm (FWHM), for optically pumping said gain medium at a wavelength of said $D_2$ transition, including optically pumping in the Lorentzian spectral wings of said $D_2$ transition, wherein laser light at wavelength $\lambda(D_1)$ operatively passed through said gain medium will be amplified at a wavelength of said $D_1$ transition.

2. The alkali vapor optical amplifier of claim 1, wherein said pump laser comprises at least one semiconductor diode laser emitting at said wavelength $\lambda(D_2)$.

3. The alkali vapor optical amplifier of claim 2, wherein said at least one semiconductor diode laser emits at a wavelength of ~852 nm.

4. The alkali vapor optical amplifier of claim 2, wherein said at least one semiconductor diode laser comprises material selected from the group consisting of AlGaAs, InGaAsP, and InGaAlP.

5. The alkali vapor optical amplifier of claim 2, wherein said at least one semiconductor diode laser emits at a wavelength of ~780 nm.

6. The alkali vapor optical amplifier of claim 1, further comprising an optical cell through which said mixture flows or is contained.

7. The alkali vapor optical amplifier of claim 6, further comprising a hollow lens duct positioned to direct pump radiation from said pump laser into said optical cell.

8. The alkali vapor optical amplifier of claim 1, wherein said alkali vapor is selected from the group consisting of cesium (Cs), rubidium (Rb), potassium (K), sodium (Na), and lithium (Li).

9. The alkali vapor optical amplifier of claim 1, wherein said at least one buffer gas is selected from the group consisting of rare gases and light molecular gases.

10. The alkali vapor optical amplifier of claim 9, wherein said rare gases are selected from the group consisting of xenon, krypton, argon, neon, and helium.

11. The alkali vapor optical amplifier of claim 9, wherein said light molecular gases are selected from the group consisting of hydrogen, methane, ethane, propane, and their deuterated analogues.

12. The alkali vapor optical amplifier of claim 1, wherein the alkali vapor is cesium and the buffer gases are helium and ethane.

13. The alkali vapor optical amplifier of claim 1, wherein the alkali vapor is rubidium and the buffer gases are helium and ethane.

14. The alkali vapor optical amplifier of claim 1, wherein said alkali vapor comprises potassium and wherein said at least one buffer gas is selected from the group consisting of helium and argon.

15. The alkali vapor optical amplifier of claim 1, wherein said at least one semiconductor diode laser emits at a wavelength of ~766 nm.

16. A method for amplifying laser light, comprising:
pumping, with a pump laser having an emission spectral width within the range from 1–6 nm (FWHM), an alkali/buffer gas gain mixture at a wavelength $\lambda(D_2)$ of a pressure-broadened $D_2$ transition of an alkali atomic vapor, wherein said mixture is optically pumped well into the Lorentzian spectral wings of said $D_2$ transition; and
extracting spectrally narrowband radiation at a wavelength $\lambda(D_1)$ generated on a spectrally-homogeneous $D_1$ transition of said alkali atomic vapor, wherein said buffer gas collisionally induces a transfer of pump excitation from the upper level of said $D_2$ transition to the upper level of said $D_1$ transition at a rate larger than the radiative decay rate of either of these two levels, wherein said mixture comprises at least one buffer gas, wherein said at least one buffer gas has the dual purpose of collisionally broadening said $D_2$ transition and collisionally transferring pump excitation from the upper level of said $D_2$ transition to the upper level of said $D_1$ transition at a rate larger than the radiative decay rate of either of these two levels.

17. A method for converting spectrally broadband radiation from a pump semiconductor diode laser array into a high power beam with spectrally narrowband radiation, comprising the steps of:
depositing, into a defined volume of an alkali/buffer-gas gain mixture, pump radiation at a wavelength $\lambda(D_2)$ matching a wavelength of a $D_2$ transition of said alkali/buffer-gas gain mixture, including optical pumping in the Lorentzian spectral wings of said $D_2$ transition, wherein said pump radiation is provided by a multi-spatial-mode semiconductor diode laser or laser array comprising an emission spectral width within the range from 1–6 nm (FWHM);

spatially over-lapping said volume with the volume through which a spectrally narrowband master oscillator extraction beam propagates; and extracting power from said alkali/buffer-gas gain mixture in a spectrally narrowband, amplified MO beam at an output wavelength $\lambda(D_1)$ matching a wavelength of a $D_1$ transition of said alkali vapor, wherein said buffer gas collisionally induces a transfer of pump excitation from the upper level of said $D_2$ transition to the upper level of said $D_1$ transition at a rate larger than the radiative decay rate of either of these two levels, wherein said mixture comprises at least one buffer gas, wherein said at least one buffer gas has the dual purpose of collisionally broadening said $D_2$ transition and collisionally transferring pump excitation from the upper level of said $D_2$ transition to the upper level of said $D_1$ transition at a rate larger than the radiative decay rate of either of these two levels.

18. A method for converting the substantially-divergent, multi-spatial-mode of semiconductor diode laser array pump radiation into a near diffraction-limited coherent laser radiation, comprising the steps of:

depositing, into a defined volume of an alkali/buffer-gas gain mixture, pump radiation at a wavelength $\lambda(D_2)$ matching a wavelength of a $D_2$ transition of said alkali/buffer-gas gain mixture, including optical pumping in the Lorentzian spectral wings of said $D_2$ transition, wherein said pump radiation is provided by a multi-spatial-mode semiconductor diode laser or laser array comprising an emission spectral width within the range from 1–6 nm (FWHM);

spatially over-lapping said volume with the volume through which the master oscillator extraction beam propagates; and extracting power from said alkali/buffer-gas gain mixture in the amplified MO beam at an output wavelength $\lambda(D_1)$ matching a wavelength of a $D_1$ transition of said alkali vapor, wherein said buffer gas collisionally induces a transfer of pump excitation from the upper level of said $D_2$ transition to the upper level of said $D_1$ transition at a rate larger than the radiative decay rate of either of these two levels, wherein said mixture comprises at least one buffer gas, wherein said at least one buffer gas has the dual purpose of collisionally broadening said $D_2$ transition and collisionally transferring pump excitation from the upper level of said $D_2$ transition to the upper level of said $D_1$ transition at a rate larger than the radiative decay rate of either of these two levels.

\* \* \* \* \*